Sept. 20, 1932.  W. F. SCHAKEL ET AL  1,877,982
FERTILIZER DISTRIBUTOR

Filed June 30, 1930

INVENTORS.
Walter F. Schakel.
Adolph C. Waterman.

Patented Sept. 20, 1932

1,877,982

UNITED STATES PATENT OFFICE

WALTER F. SCHAKEL AND ADOLPH C. WATERMAN, OF INDIANAPOLIS, INDIANA; SAID SCHAKEL ASSIGNOR TO SAID WATERMAN

FERTILIZER DISTRIBUTOR

Application filed June 30, 1930. Serial No. 464,862.

This invention relates to fertilizer distributors and is designed primarily for distributing fertilizer around growing plants and one feature of the invention is the provision of means for depositing a quantity of fertilizer around the plant and at a distance from the roots thereof.

A further feature of the invention is the provision of manually operated means for controlling the release of the fertilizer from the fertilizer receptacle.

A further feature of the invention is the provision of means for regulating the supply of fertilizer discharging from the fertilizer receptacle.

A further feature of the invention is the provision of means for preventing the discharging fertilizer coming in direct contact with the plant.

A further feature of the invention is in constructing the distributor in sections so that it may be readily assembled or taken apart.

A further feature of the invention is in so constructing the parts of the device that it will be comparatively light in weight and may be readily and easily transported from plant to plant.

Other objects and advantages will be hereinafter more fully set forth and pointed out in the accompanying specification.

In the accompanying drawing which is made a part of this application,

Figure 1:
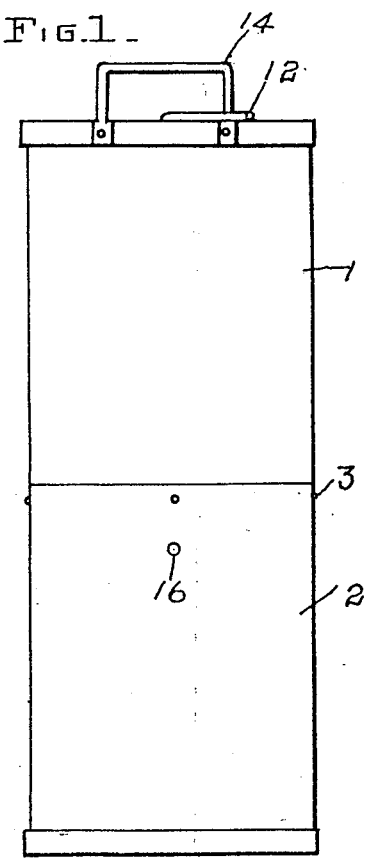
Figure 1 is a side elevation of the distributor.

Referring to the drawing in which similar reference numerals designate corresponding parts throughout the several views, the numeral 1 designates the upper or hopper portion of the distributor and 2 indicates the lower portion thereof, one of which telescopes within the end of the other and said sections are removably secured together in any suitable manner, as by means of screw bolts 3 or the like.

The lower portion of the hopper section 1 is provided with a partition disc 4 and the upper portion of the section 2 is provided with a similar partition disc 5, said discs forming a compartment 6, in which is located a distributor block 7.

The block 7 has a plurality of bores 8 therethrough, which are adapted to register with openings 9 through the partition disc 4, when the block 7 is turned to one position and register with like openings 10 in the disc 5 when turned to another position, said block being rotated through the medium of a shaft 11, the upper end of which is provided with an operating lever 12. The lower end of the shaft 11 extends through the disc 4 and is connected in any suitable manner with the block 7, while the upper end of the shaft extends through a cross bar 13, at the upper end of the hopper section 1, the lever 12 projecting laterally and preferably through one of a pair of supporting handles 14, said handle limiting the swinging movement of the lever.

Figure 3:
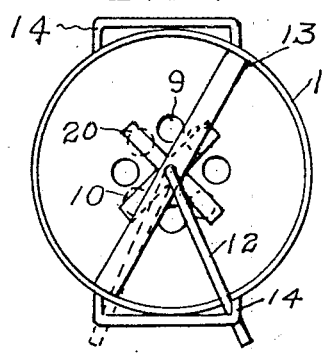
Figure 3 is a top plan view of the distributor.
Figure 4:
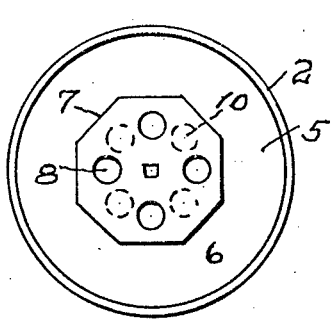
Figure 4 is a top plan view of the lower section of the distributor as indicated at 4—4, Fig. 2.
Figure 5:
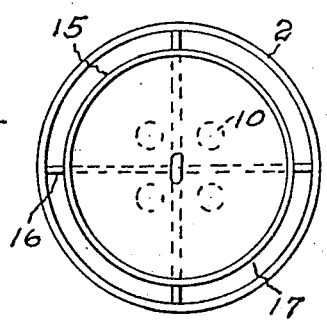
Figure 5 is a bottom plan view of the distributor.

The openings 9 are so located that when the lever 12 is in the position shown in full lines in Fig. 3, the bores 8 in the block 7 will be in registration therewith so that said bores may fill with fertilizer and will register with the openings 10, when the lever is swung to the position shown by dotted lines in Fig. 3, the openings 9 and 10 being out of alinement with each other to prevent a constant feed of the fertilizer.

The lower section 2 is so constructed that it will extend over and surround a growing plant without coming in contact therewith and in order to cause the fertilizer to deposit a distance from the plant, a cone shaped shield 15 is secured in the lower section 2 by any suitable means as by extending rods 16 transversely through the section 2 and through the apex end of the shield 15, the diameter of the shield being less than the diameter of the section 2 to provide a passage 17 for the discharge of the fertilizer. By making the shield 15 substantially funnel shaped, the fertilizer will be distributed in substantially ring like formation around the plant so that the cultivator will properly distribute the fertilizer without bringing the fertilizer in direct contact with the plant.

Figure 6:
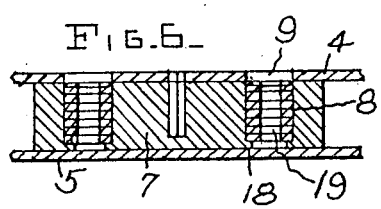
Figure 6 is an enlarged detail sectional view through the fertilizer distributing elements.

As best shown in Fig. 6, when it is desired to reduce or regulate the amount of fertilizer released at each operation of the block 7, a ledge 18 may be formed at the lower end of each bore 8 and a plurality of washers 19 or the like introduced into said bores for reducing the capacity of the bores and the size of the washers may be varied as desired.

Figure 2:
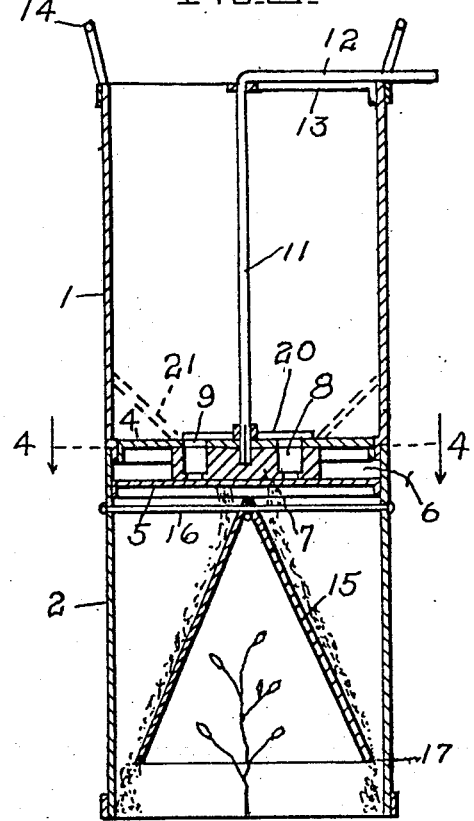
Figure 2 is a central vertical sectional view thereof, showing the manner of positioning the same over a plant.

If desired, an agitator 20 may be attached to the shaft 11 for agitating the fertilizer immediately above the openings 9 and in some instances the lower end of the hopper forming section 1 may be provided with inclined walls as indicated by dotted lines 21, Fig. 2.

In operation, a supply of fertilizer is placed in the hopper forming section 1 and the lever 11 turned until the bores 8 are brought into registration with the openings 9, when said bores will fill with fertilizer. The lower section 2 is then placed over a plant, as indicated in Fig. 2 and the lower end of the section 2 rested upon the ground. The lever 11 is then swung laterally to the position shown by dotted lines, Fig. 3, which will move the bores 8 into registration with the openings 10, when the supply of fertilizer in the bores 8 will discharge on to the shield 15 and descend to the ground. The operation is then repeated until all the plants have been treated.

Although we have described our invention as a fertilizer distributor, it will be understood that it may be used for various other purposes, such as depositing lime and kindred substances and is particularly useful in what is known as dusting young plants to protect them from insects and when so used, the shield 15 is preferably removed so that the dusting material may descend directly onto the plants.

What we claim is:

1. A fertilizer distributor comprising a hopper forming section, a hollow section end to end with said hopper section, means for removably connecting said sections, a rotating distributing block adapted to distribute the contents of said hopper section, discs for confining said block, handles on said hopper section for transporting the distributor, a shaft attached to said distributing block, and a lever connected with said shaft and projecting through one of said handles, whereby the movement of the lever and rotation of said block will be limited.

2. In a device for distributing fertilizer or the like in circular formation around a growing plant, comprising a hollow member, a pair of discs separating said hollow member into an upper and lower compartment, said discs having non-registering openings for the discharge of fertilizer, a block confined between said discs and having openings adapted to be moved into or out of registration with the openings in the discs, means for rotating said block, and handles at the upper end of said hollow member, one of said handles limiting the movement of said block rotating means for positively registering the openings in the block with the openings in the discs.

3. In a device for distributing a fertilizing medium, a hollow member, means for separating said hollow member into compartments, a block confined between said separating means, a shaft for rotating said block, a lever at the upper end of said shaft, and handles at the upper end of said hollow member, one of said handles limiting the swinging movement of said lever in both directions.

In testimony whereof we have hereunto affixed our signatures.

WALTER F. SCHAKEL.
ADOLPH C. WATERMAN.